United States Patent
Bae

(10) Patent No.: US 10,103,579 B2
(45) Date of Patent: Oct. 16, 2018

(54) DEVICE FOR RECEIVING WIRELESS POWER

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 424 days.

(21) Appl. No.: 14/913,634

(22) PCT Filed: Aug. 19, 2014

(86) PCT No.: PCT/KR2014/007651
§ 371 (c)(1),
(2) Date: Feb. 22, 2016

(87) PCT Pub. No.: WO2015/026119
PCT Pub. Date: Feb. 26, 2015

(65) Prior Publication Data
US 2016/0204658 A1    Jul. 14, 2016

(30) Foreign Application Priority Data

Aug. 20, 2013  (KR) .................. 10-2013-0098446

(51) Int. Cl.
*H01F 27/42* (2006.01)
*H02J 50/12* (2016.01)
(Continued)

(52) U.S. Cl.
CPC .............. *H02J 50/12* (2016.02); *H02J 5/005* (2013.01); *H02J 7/025* (2013.01); *H02J 17/00* (2013.01);
(Continued)

(58) Field of Classification Search
USPC ........................................................ 307/104
See application file for complete search history.

(56) References Cited

U.S. PATENT DOCUMENTS

2003/0197598 A1   10/2003  Hayashi
2008/0298100 A1   12/2008  Esaka et al.
(Continued)

FOREIGN PATENT DOCUMENTS

JP    2008-99352 A    4/2008
JP    2011-139621 A   7/2011
(Continued)

OTHER PUBLICATIONS

International Search Report, issued in PCT/KR2014/007651, dated Dec. 4, 2014.

*Primary Examiner* — Rexford Barnie
*Assistant Examiner* — Dru Parries
(74) *Attorney, Agent, or Firm* — Birch, Stewart, Kolasch & Birch, LLP

(57) ABSTRACT

A wireless power reception device that wirelessly receives power from a wireless power transmission device according to an embodiment of the present invention includes a reception coil receiving power from the wireless power transmission device wirelessly through a magnetic field, and a switch connected to one end and the other end of the reception coil, wherein the wireless power reception device controls the operation of the switch according to the frequency band of the power transmitted by the wireless power transmission device.

19 Claims, 5 Drawing Sheets

(51) Int. Cl.
  *H02J 7/02* (2016.01)
  *H02J 50/80* (2016.01)
  *H02J 17/00* (2006.01)
  *H02J 5/00* (2016.01)
  *H02M 7/217* (2006.01)
  *H02J 50/10* (2016.01)

(52) U.S. Cl.
  CPC .............. *H02J 50/10* (2016.02); *H02J 50/80* (2016.02); *H02M 7/217* (2013.01)

(56) References Cited

U.S. PATENT DOCUMENTS

| | | | |
|---|---|---|---|
| 2010/0164295 A1* | 7/2010 | Ichikawa | H02J 50/12 307/104 |
| 2010/0244580 A1 | 9/2010 | Uchida et al. | |
| 2011/0127846 A1 | 6/2011 | Urano | |
| 2011/0133569 A1 | 6/2011 | Cheon et al. | |
| 2011/0304216 A1 | 12/2011 | Baarman | |
| 2011/0316347 A1 | 12/2011 | Endo et al. | |
| 2012/0001485 A1* | 1/2012 | Uchida | H02J 7/025 307/11 |
| 2012/0025623 A1 | 2/2012 | Low et al. | |
| 2012/0038220 A1 | 2/2012 | Kim et al. | |
| 2012/0038317 A1 | 2/2012 | Miyamoto et al. | |
| 2012/0235508 A1* | 9/2012 | Ichikawa | H02J 50/40 307/104 |
| 2012/0267961 A1 | 10/2012 | Endo et al. | |
| 2012/0282971 A1 | 11/2012 | Kim et al. | |
| 2013/0076306 A1 | 3/2013 | Lee et al. | |
| 2013/0128638 A1 | 5/2013 | Irish | |
| 2013/0154386 A1 | 6/2013 | Bae | |
| 2014/0312709 A1 | 10/2014 | Nakano et al. | |
| 2015/0318710 A1 | 11/2015 | Lee et al. | |

FOREIGN PATENT DOCUMENTS

| | | |
|---|---|---|
| JP | 2012-34487 A | 2/2012 |
| JP | 2013-102594 A | 5/2013 |
| KR | 10-2012-0127231 A | 11/2012 |
| KR | 10-2013-0041981 A | 4/2013 |
| KR | 10-2013-0070451 A | 6/2013 |
| KR | 10-2014-0077070 A | 6/2014 |
| WO | WO 2011/156555 A2 | 12/2011 |

* cited by examiner

【Figure 1】
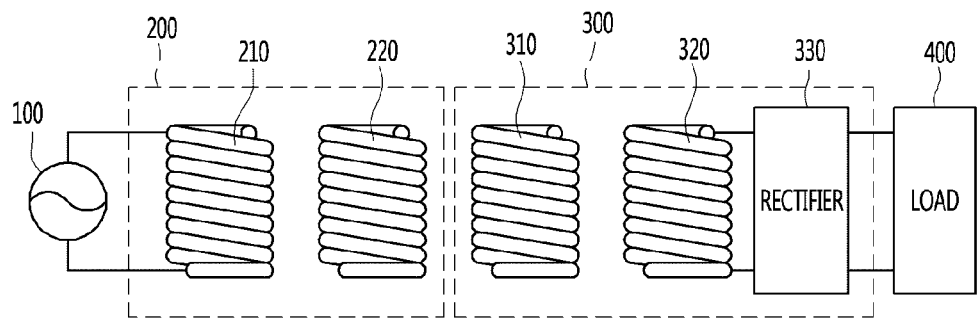
【Figure 2】
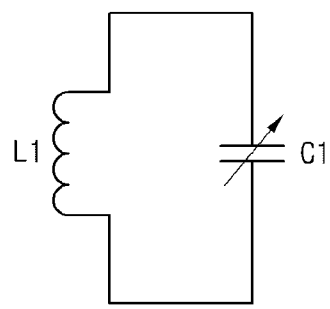
【Figure 3】
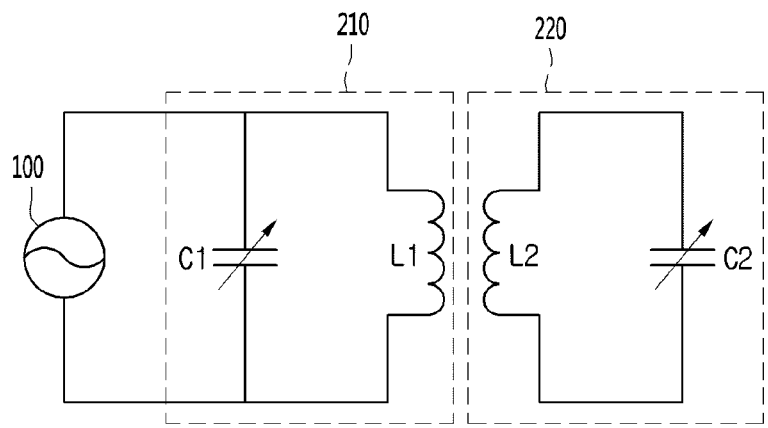

【Figure 4】
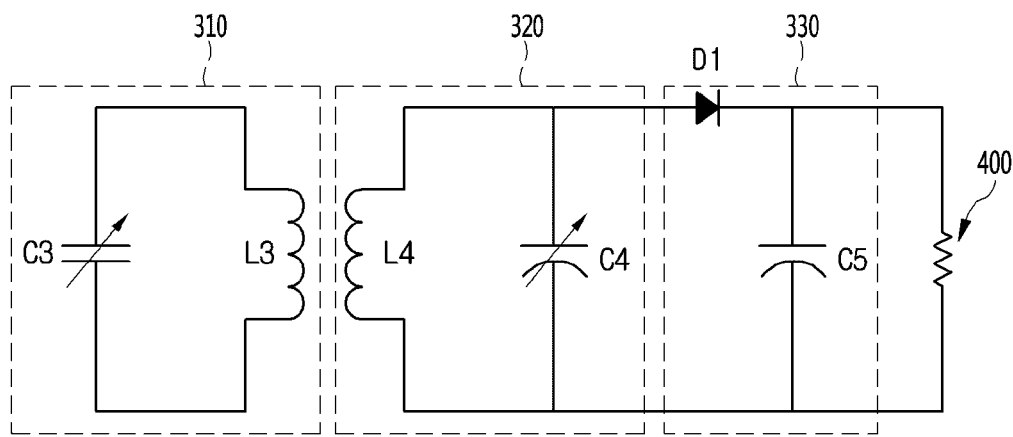
【Figure 5】
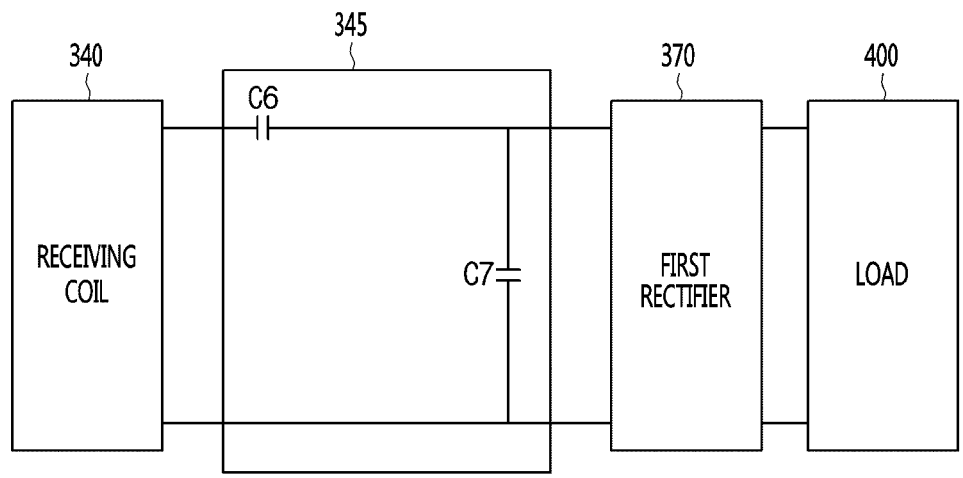

【Figure 6】
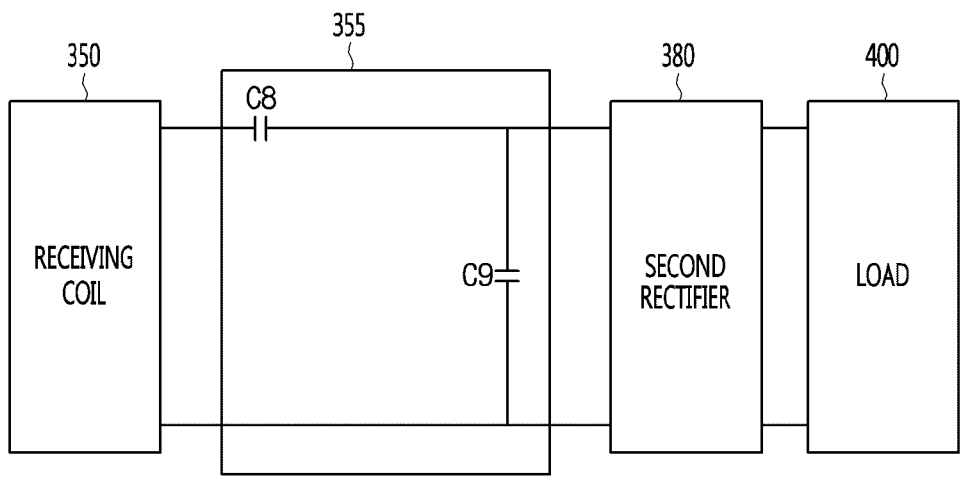
【Figure 7】
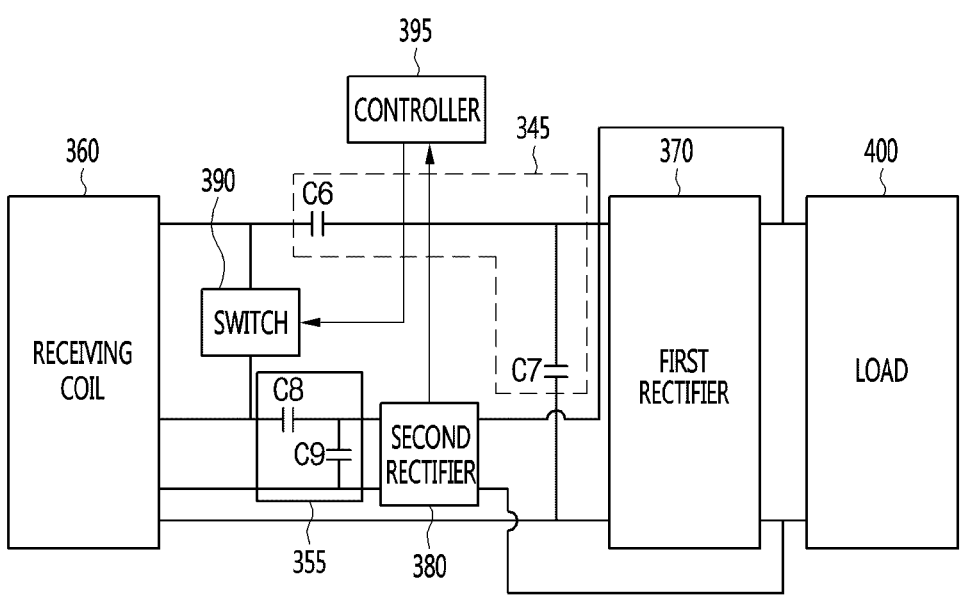

[Figure 8]
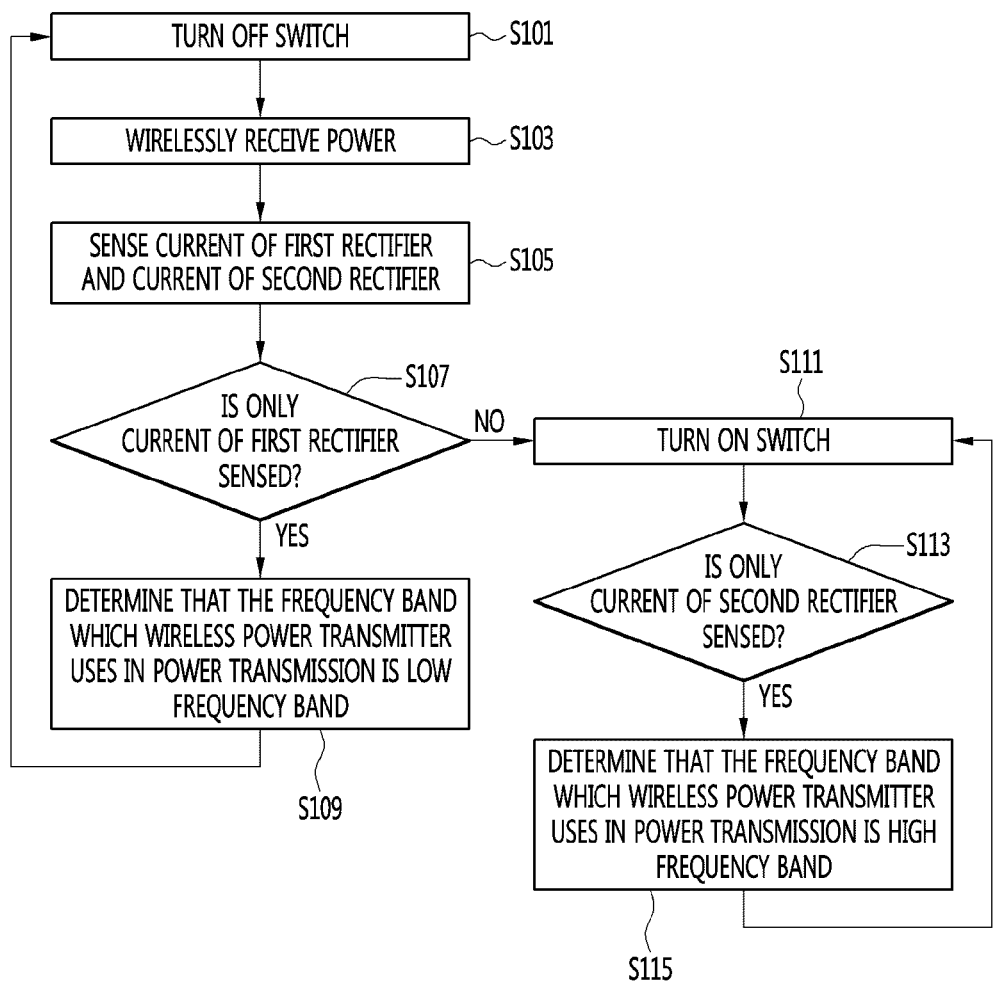

【Figure 9】
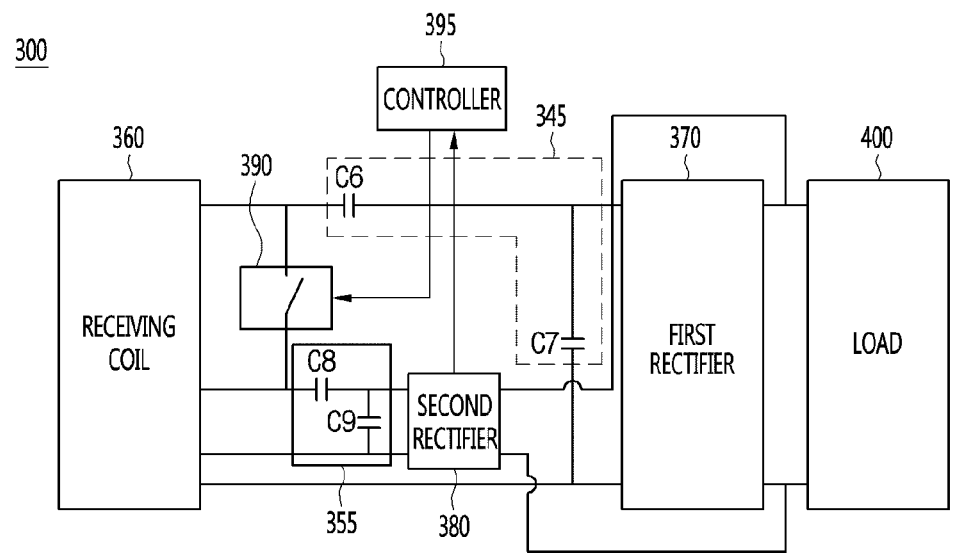
【Figure 10】
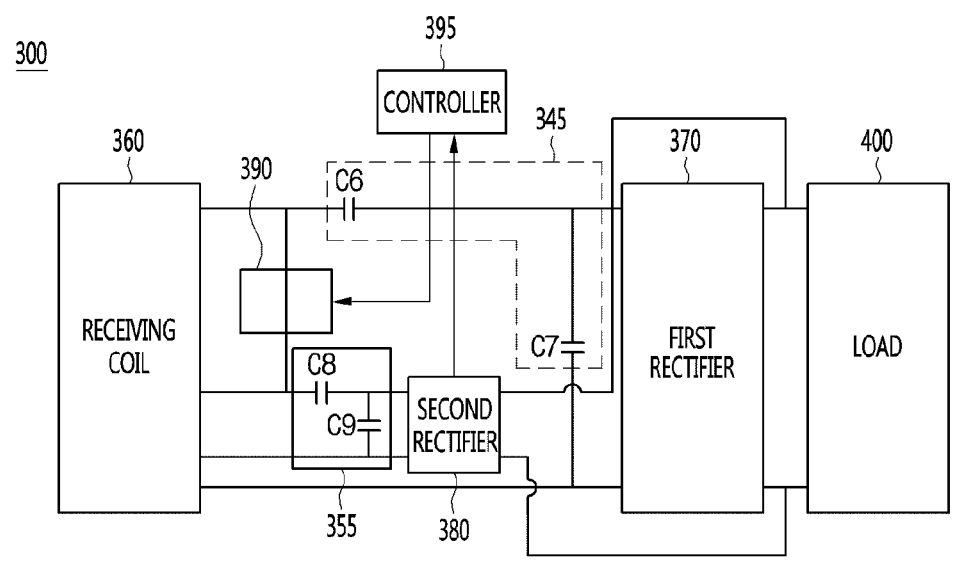

DEVICE FOR RECEIVING WIRELESS POWER

CROSS REFERENCE TO RELATED APPLICATIONS

This application is the National Phase of PCT International Application No. PCT/KR2014/007651, filed on Aug. 19, 2014, which claims priority under 35 U.S.C. 119(a) to Korean application No. 10-2013-0098446, filed on Aug. 20, 2013, all of which are hereby expressly incorporated by reference into the present application.

TECHNICAL FIELD

The present invention relates to a wireless power transmitting technology, and more particularly, to a wireless power receiver capable of wirelessly receiving power regardless of a frequency band.

BACKGROUND ART

Wireless power transmission or wireless energy transfer technology which wirelessly transfers electric energy already started in 1800 with the use of an electric motor or a transformer using a principle of electromagnetic induction. Then, methods of transmitting electric energy by emitting electromagnetic waves such as radio waves or lasers were tried. Electric toothbrushes or some of wireless razors that we frequently use are actually charged using the principle of electromagnetic induction. Electromagnetic induction refers to a phenomenon in which a voltage is induced and a current flows when a magnetic field is changed around a conductor. The electromagnetic induction method is being rapidly commercialized, but it has a disadvantage of a short transmission distance of power.

Up to now, an energy transfer method using a wireless method includes a long range transmitting technology and the like using resonance and a short wave wireless frequency in addition to electromagnetic induction.

Recently, an energy transfer method using resonance of the wireless power transmission technology is being widely used.

In a wireless power transmission system using resonance, power is transferred through coils of a transmission side and a receiving side, and therefore the user can easily charge electronic apparatuses such as mobile apparatuses.

A wireless power transmitter transmits power having a frequency band for every wireless power transmitter to a receiver. In this case, a wireless power receiver is configured to match a corresponding frequency band, and is able to receive only a power of a specific frequency band. That is, in the conventional art, when a frequency band of power transmitted by the wireless power transmitter is changed, there is a problem that the wireless power receiver cannot correctly receive the power.

Technical Problem

The present invention is directed to providing a wireless power receiver capable of receiving power regardless of a power transmission method of a wireless power receiver.

Technical Solution

One aspect of the present invention provides a wireless power receiver wirelessly receiving power from a wireless power transmitter including a receiving coil configured to wirelessly receive the power from the wireless power transmitter through a magnetic field, and a switch connected to one end and the other end of the receiving coil. The wireless power receiver controls an operation of the switch based on a frequency band of the power transmitted by the wireless power transmitter.

The frequency band of the power transmitted by the wireless power transmitter may include a first frequency band and a second frequency band, and the first frequency band is lower than the second frequency band.

The wireless power receiver may open the switch when the frequency band of the power transmitted by the wireless power transmitter is the first frequency band.

The wireless power receiver may open the switch to maintain an inductance of the receiving coil.

The wireless power receiver may close the switch when the frequency band of the power transmitted by the wireless power transmitter is the second frequency band.

The wireless power receiver may close the switch to decrease an inductance of the receiving coil.

The wireless power receiver may further include a first rectifier configured to rectify a power of the first frequency band received from the receiving coil and transfer the rectified power to a load, and a second rectifier configured to rectify a power of the second frequency band received from the receiving coil and transfer the rectified power to the load.

The wireless power receiver may sense a current flowing through the first rectifier and a current flowing through the second rectifier, and detect the frequency band of the power transmitted by the wireless power transmitter.

When only the current flowing through the first rectifier is sensed, the wireless power receiver may determine that the frequency band of the power transmitted by the wireless power transmitter is the first frequency band, and open the switch.

When only the current flowing through the second rectifier is sensed, the wireless power receiver may determine that the frequency band of the power transmitted by the wireless power transmitter is the second frequency band, and close the switch.

Advantageous Effects

Since the wireless power receiver according to various embodiments of the present invention receives power regardless of a frequency band which a wireless power transmitter uses in power transmission, the convenience of a user who uses a terminal in which the wireless power receiver is embedded can be improved. That is, the user can easily charge the terminal regardless of a directly coupling method or an inductively coupling method used by the wireless power transmitter.

Further, according to embodiments of the present invention, because one receiving coil is used, a space of a terminal may be saved and cost may be greatly saved compared to the case in which two coils are used regardless of a power transmission method.

Meanwhile, other various effects not mentioned above will be directly or implicitly disclosed in the detailed description described below.

DESCRIPTION OF DRAWINGS

FIG. 1 is a diagram for describing a wireless power transmitting system according to an embodiment of the present invention.

FIG. 2 is an equivalent circuit diagram of a transmission induction coil 210 according to an embodiment of the present invention.

FIG. 3 is an equivalent circuit diagram of a power supply 100 and a wireless power transmitter 200 according to an embodiment of the present invention.

FIG. 4 is an equivalent circuit diagram of a wireless power receiver 300 according to an embodiment of the present invention.

FIG. 5 is a diagram for describing a configuration of a wireless power receiver according to another embodiment of the present invention.

FIG. 6 is a diagram for describing a configuration of a wireless power receiver according to still another embodiment of the present invention.

FIG. 7 is a diagram for describing a configuration of a wireless power receiver according to yet another embodiment of the present invention.

FIG. 8 is a flowchart for describing a method of receiving power of a wireless power receiver according to an embodiment of the present invention.

FIG. 9 is a diagram for describing an operation of a wireless power receiver according to an embodiment of the present invention.

FIG. 10 is a diagram for describing an operation of a wireless power receiver according to another embodiment of the present invention.

MODE FOR INVENTION

Hereinafter, the preferred embodiments of the present invention will be described in detail with reference to the accompanying drawings so that those skilled in the art may easily embody.

In the present invention, a method of transmitting power based on electromagnetic induction may have a relatively low Q value, and may refer to a tightly coupling method, and a method of transmitting a power based on resonance may have a relatively high Q value, and may refer to a loosely coupling method.

In the tightly coupling method according to an embodiment, a frequency band used in power transmission may be in a range of 100 kHz to 300 kHz, and in the loosely coupling method, a frequency band used in the power transmission may be one of 6.78 MHz and 13.56 MHz. However, these figures are merely examples.

Further, the loosely coupling method of transmitting a power using resonance of the present invention may include a directly coupling method and an inductively coupling method.

The directly coupling method is a method in which each of a wireless power transmitter and a wireless power receiver described below directly transmits power using one resonance coil, and the inductively coupling method is a method in which a wireless power transmitter transmits power through two transmitting coils to a wireless power receiver including two receiving coils.

FIG. 1 is a diagram for describing a wireless power transmitting system according to an embodiment of the present invention.

Referring to FIG. 1, the wireless power transmitting system may include a power supply 100, a wireless power transmitter 200, a wireless power receiver 300, and a load 400.

In an embodiment, the power supply 100 may be included in the wireless power transmitter 200.

In an embodiment, the wireless power transmitter 200 may transmit a power using resonance, and may be implemented as the inductively coupling method which includes a transmission induction coil 210 and a transmission resonance coil 220, or by the directly coupling method which includes only one transmission induction coil 210.

The wireless power receiver 300 may wirelessly receive power from the wireless power transmitter 200, and when the wireless power transmitter 200 is implemented as the inductively coupling method which includes the transmission induction coil 210 and the transmission resonance coil 220, the wireless power receiver 300 may also be implemented as the inductively coupling method which includes a reception resonance coil 310 and a reception induction coil 320.

Meanwhile, when the wireless power transmitter 200 includes only the transmission induction coil 210, the wireless power receiver 300 may also include only the reception induction coil 320, and may also be implemented as the directly coupling method.

The wireless power receiver 300 may further include a rectifier 330.

The rectifier 330 is described in detail below.

Both ends of the power supply 100 are connected to both ends of the transmission induction coil 210, respectively.

The transmission resonance coil 220 may be disposed separately from the transmission induction coil 210 by a certain distance.

The reception resonance coil 310 may be disposed separately from the reception induction coil 320 by a certain distance.

Both ends of the reception induction coil 320 may be connected to both ends of the rectifier 330, respectively, and the load 400 may be connected to both ends of the rectifier 330. In an embodiment, the load 400 may be included in the wireless power receiver 300.

The power generated by the power supply 100 may be transferred to the wireless power transmitter 200, and the power transferred to the wireless power transmitter 200 may be transferred to the wireless power receiver 300 which is resonant with the wireless power transmitter 200 by a resonance phenomenon, i.e., has the same resonant frequency.

Hereinafter, a process of a power transmission will be described in more detail.

The power supply 100 may generate alternating current (AC) power and transfer the generated power to the wireless power transmitter 200.

When an AC flows through the transmission induction coil 210 by the power received from the power supply 100, the AC may flow through the transmission resonance coil 220 physically separated from the transmission induction coil 210 by electromagnetic induction.

Then, the power transferred to the transmission resonance coil 220 may be transferred to the wireless power receiver 300 which is resonant with the wireless power transmitter 200 by the resonance phenomenon.

The power may be transferred between two LC circuits matched in impedance with each other. Therefore, the power transmission by the resonance may transfer the power to a distance longer than the case of being tightly coupled by a general electromagnetic induction because the transmission resonance coil 220 and the reception resonance coil 310 are loosely coupled to each other. Therefore, the wireless power transmitter 200 and the wireless power receiver 300 may have a much higher degree of freedom of arrangement and high efficiency in power transmission.

The reception resonance coil 310 may receive the power by the resonance from the transmission resonance coil 220. Due to the received power, the AC may flow through the reception resonance coil 310 and the power transferred to the reception resonance coil 310 may be transferred to the reception induction coil 320 inductively coupled to the reception resonance coil 310 by the electromagnetic induction. The power transferred to the reception induction coil 320 may be rectified by the rectifier 330 and transferred to the load 400.

In an embodiment, the transmission induction coil 210, the transmission resonance coil 220, the reception resonance coil 310, and the reception induction coil 320 may respectively have one of a spiral structure and a helical structure, but it is not limited thereto.

The transmission resonance coil 220 of the wireless power transmitter 200 may transfer the power to the reception resonance coil 310 of the wireless power receiver 300 through a magnetic field.

Specifically, the transmission resonance coil 220 and the reception resonance coil 310 may be resonantly coupled to each other to operate at a resonant frequency.

Because of the resonant coupling of the transmission resonance coil 220 and the reception resonance coil 310, power transmission efficiency between the wireless power transmitter 200 and the wireless power receiver 300 may be improved greatly.

In an embodiment, when the wireless power transmitting system performs the power transmission based on the electromagnetic induction, the wireless power transmitter 200 may not include the transmission resonance coil 220, and the wireless power receiver 300 may not include the reception resonance coil 310.

In wireless power transmission, a quality factor and a coupling coefficient may have significant meanings. That is, the power transmission efficiency may be more improved as the quality factor and the coupling coefficient become larger.

The quality factor may refer to an index of energy which may be accumulated near the wireless power transmitter 200 or the wireless power receiver 300.

The quality factor may be varied based on an operation frequency (w), a shape of a coil, a size, a material, etc. The quality factor may be expressed in a mathematical expression as Q=w*L/R. L denotes inductance of a coil, and R denotes resistance corresponding to an amount of power loss generated in the coil itself.

The quality factor may be in a range of 0 to infinity, and as the quality factor increases, the power transmission efficiency between the wireless power transmitter 200 and the wireless power receiver 300 may be improved.

The coupling coefficient may refer to a degree of magnetic coupling between a coil of a transmission side and a coil of a reception side, and be in a range of 0 to 1.

The coupling coefficient may be varied based on a relative position or a distance between the coil of the transmission side and the coil of the reception side.

FIG. 2 is an equivalent circuit diagram of a transmission induction coil 210 according to an embodiment of the present invention.

As shown in FIG. 2, the transmission induction coil 210 may include an inductor L1 and a capacitor C1, and a circuit having a suitable inductance and capacitance may be formed by the inductor L1 and the capacitor C1.

The transmission induction coil 210 may include an equivalent circuit in which both ends of the inductor L1 are connected to both ends of the capacitor C1, respectively.

That is, the transmission induction coil 210 may include an equivalent circuit in which the inductor L1 and the capacitor C1 are connected in parallel.

The capacitor C1 may be a variable capacitor, and impedance matching may be performed as capacitance of the capacitor C1 is controlled. Equivalent circuits for the transmission resonance coil 220, the reception resonance coil 310, and the reception induction coil 320 may be the same as that shown in FIG. 2.

FIG. 3 is an equivalent circuit diagram of a power supply 100 and a wireless power transmitter 200 according to an embodiment of the present invention.

As shown in FIG. 3, the transmission induction coil 210 and the transmission resonance coil 220 may respectively include an inductor L1 or L2 and a capacitor C1 or C2 each having a predetermined inductance and capacitance.

FIG. 4 is an equivalent circuit diagram of a wireless power receiver 300 according to an embodiment of the present invention.

As shown in FIG. 4, the reception resonance coil 310 and the reception induction coil 320 may respectively include an inductor L3 or L4 and a capacitor C3 or C4 each having a predetermined inductance and capacitance.

The rectifier 330 may convert the AC power received from the reception induction coil 320 into direct current (DC) power, and transfer the converted DC power to the load 400.

Specifically, the rectifier 330 may include a rectifier and a smoothing circuit. In an embodiment, the rectifier may be a silicon rectifier and may be equivalent to a diode D1 as shown in FIG. 4.

The rectifier may convert the AC power received from the reception induction coil 320 into DC power.

The smoothing circuit may remove an AC component included in the DC power converted by the rectifier, and may output a smooth DC power. In an embodiment, the smoothing circuit may be a rectifying capacitor C5, but it is not limited thereto.

The load 400 may be an arbitrary rechargeable battery or a device which requires DC power. For example, the load 400 may denote a battery.

The wireless power receiver 300 may be installed in an electronic apparatus, such as a mobile phone, a notebook computer, a mouse, etc., in which the power is required. Therefore, the reception resonance coil 310 and the reception induction coil 320 may have a shape suitable for the electronic apparatus.

The wireless power transmitter 200 may exchange information with the wireless power receiver 300 using an in-band or out-of-band communication.

The in-band communication may refer to a communication in which information is exchanged between the wireless power transmitter 200 and the wireless power receiver 300 using a signal having a frequency used in wireless power transmission. The wireless power receiver 300 may further include a switch, and may receive or not receive the power transmitted by the wireless power transmitter 200 based on a switching operation of the switch. Therefore, the wireless power transmitter 200 may detect an amount of power consumed by the wireless power transmitter 200 so that the wireless power transmitter 200 may recognize an on or off signal of the switch included in the wireless power receiver 300.

Specifically, the wireless power receiver 300 may change an amount of a power absorbed by a resistor using the resistor and a switch to change the power consumed by the wireless power transmitter 200. The wireless power transmitter 200 detects a change of the consumed power to obtain state information of the wireless power receiver 300. The switch and the resistor may be connected in series. In an embodiment, the state information of the wireless power receiver 300 may include information on a current amount of charging and a trend of an amount of charging of the wireless power receiver 300.

More specifically, when the switch is opened, the power absorbed by the resistor becomes zero, and the power consumed by the wireless power transmitter 200 may also decrease.

When the switch is closed, the power absorbed by the resistor becomes greater than zero, and the power consumed by the wireless power transmitter 200 may increase. In the wireless power receiver, when the operations described above are repeated, the wireless power transmitter 200 may perform digital communication with the wireless power receiver 300 by detecting the power consumed by the wireless power transmitter 200.

The wireless power transmitter 200 may receive the state information of the wireless power receiver 300 and transmit power suitable for the state information based on the operations described above.

Conversely, it is possible to include a resistor and a switch on a side of the wireless power transmitter 200 so that state information of the wireless power transmitter 200 may be transmitted to the wireless power receiver 300. In an embodiment, the state information of the wireless power transmitter 200 may include information on the maximum amount of power supply that the wireless power transmitter 200 can supply, the number of the wireless power receivers 300 to which the wireless power transmitter 200 is supplying power, and the amount of usable power of the wireless power transmitter 200.

Next, the out-of-band communication will be described.

The out-of-band communication may refer to a communication in which information required in power transmission is exchanged based on an additional frequency band other than a resonance frequency band. The wireless power transmitter 200 and the wireless power receiver 300 may include an out-of-band communication module and exchange information required to transmit power with each other. The out-of-band communication module may be installed in the power supply. In an embodiment, the out-of-band communication module may use a method of a short distance communication such as Bluetooth, ZigBee, a wireless LAN, and a near field communication (NFC), but it is not limited thereto.

Hereinafter, a wireless power receiver and a method of receiving power of the wireless power receiver according to embodiments of the present invention will be described with reference to FIGS. 1 to 4.

FIG. 5 is a diagram for describing a configuration of a wireless power receiver according to another embodiment of the present invention.

Particularly, FIG. 5 is a diagram illustrating a configuration of a wireless power receiver 300 when a frequency band that the wireless power transmitter 200 uses in power transmission is a low frequency band.

Referring to FIG. 5, the wireless power receiver 300 may include a receiving coil 340, a first frequency matching unit 345, and a first rectifier 370.

The receiving coil 340 may wirelessly receive power from the wireless power transmitter 200. A frequency band which the power received by the receiving coil 340 has may be a low frequency band, and the frequency band may be in a range of 100 kHz to 300 kHz, but this is merely an example.

When the frequency band which the power received by the wireless power receiver 300 has is a low frequency band, the receiving coil 340 may correspond to the reception induction coil 320 described in FIG. 1, and the wireless power receiver 300 may be implemented as the tightly coupling method. In this case, the wireless power transmitter may also include only the transmission induction coil 210 described in FIG. 1, and also be implemented as the tightly coupling method.

The inductance of the receiving coil 340 may be 16 uH, but this is merely an example.

The first frequency matching unit 345 may match a frequency band which the wireless power receiver 300 uses with a frequency band which the power received by the receiving coil 340 has, and after the frequency band is matched, the first frequency matching unit 345 may output the power of a matched state to the first rectifier 370.

The first frequency matching unit 345 may include a first capacitor C6 and a second capacitor C7. The first capacitor C6 and the second capacitor C7 may be one of a constant capacitor and a variable capacitor. For example, when each of the first capacitor C6 and the second capacitor C7 is the constant capacitor, capacitance of the first capacitor C6 may be 137 nF and capacitance of the second capacitor C7 may be 1.6 nF, but this is merely an example.

The first frequency matching unit 345 may perform a frequency matching using inductance of the receiving coil 340 and capacitance of the first capacitor C6 and the second capacitor C7.

The first rectifier 370 may receive power having a frequency-matched state from the first frequency matching unit 345 and transfer the power to the load 400. Specifically, the first rectifier 370 may receive AC power having a state in which the frequency matching is completed from the first frequency matching unit 345, rectify the AC power into DC power, and transfer the rectified DC power to the load 400.

FIG. 6 is a diagram for describing a configuration of a wireless power receiver according to still another embodiment of the present invention.

Particularly, FIG. 6 is a diagram illustrating a configuration of a wireless power receiver 300 when a frequency band that the wireless power transmitter 200 uses in power transmission is a high frequency band.

Referring to FIG. 6, the wireless power receiver 300 may include a receiving coil 350, a second frequency matching unit 355, and a second rectifier 380.

The receiving coil 350 may wirelessly receive power from the wireless power transmitter 200. A frequency band which the power received by the receiving coil 350 has may be a high frequency band, and the frequency band may be one of 6.78 MHz and 13.56 MHz, but this is merely an example.

When the frequency band which the power received by the wireless power receiver 300 has is a high frequency band, the receiving coil 350 may correspond to the reception induction coil 320 described in FIG. 1, and the wireless power receiver 300 may be implemented as the directly coupling method of the loosely coupling method.

In another embodiment, when the frequency band which the power received by the wireless power receiver 300 has is a high frequency band, the receiving coil 350 may correspond to the reception induction coil 320 described in FIG. 1, and the wireless power receiver 300 may further include a reception resonance coil (not shown), and may be implemented as the inductively coupling method of the loosely coupling method.

The inductance of the receiving coil 350 may be 16 uH, but this is merely an example.

The second frequency matching unit 355 may match a frequency band which the wireless power receiver 300 uses with a frequency band which the power received by the receiving coil 350 has, and may output the power of a matched state to the second rectifier 380.

The second frequency matching unit 355 may include a third capacitor C8 and a fourth capacitor C9. The third capacitor C8 and the fourth capacitor C9 may be one of a constant capacitor and a variable capacitor.

For example, when each of the third capacitor C8 and the fourth capacitor C9 is the constant capacitor, capacitance of the third capacitor C8 may be 1 nF and capacitance of the fourth capacitor C9 may be 0.1 nF, but these figures are merely examples.

The second frequency matching unit 355 may perform a frequency matching using inductance of the receiving coil 350 and capacitance of the third capacitor C8 and the fourth capacitor C9.

The second rectifier 380 may receive power having a frequency-matched state from the second frequency matching unit 355 and transfer the power to the load 400.

Specifically, the second rectifier 380 may receive AC power having a state in which the frequency matching is completed from the second frequency matching unit 355, rectify the AC power into DC power, and transfer the rectified DC power to the load 400.

Comparing embodiments of FIG. 5 and FIG. 6, the frequency band used in power transmission of the wireless power transmitter which transmits power using the tightly coupling method may be in a range of 100 kHz to 300 kHz, and the frequency band used in power transmission of the wireless power transmitter which transmits power using the loosely coupling method may be 6.78 MHz or 13.56 MHz.

Therefore, the inductance of the receiving coil 340, the capacitance of the first capacitor C6, and the capacitance of the second capacitor C7 respectively used in the case which uses the tightly coupling method may have greater values than the inductance of the receiving coil 350, the capacitance of the third capacitor C8, and the capacitance of the fourth capacitor C9 respectively used in the case which uses the loosely coupling method.

That is, when a method of power transmission of the wireless power transmitter 200 is changed, the inductance of the receiving coil and the capacitance of the capacitors included in the frequency matching unit may be changed.

In the embodiments of the present invention, when power is received from the wireless power transmitter 200 with a different power transmission method, a wireless power receiver capable of receiving the power in response to the power transmission method of the corresponding wireless power transmitter 200 is provided.

FIG. 7 is a diagram for describing a configuration of a wireless power receiver according to yet another embodiment of the present invention.

Referring to FIG. 7, a wireless power receiver 300 may include a receiving coil 360, a first frequency matching unit 345, a first rectifier 370, a second frequency matching unit 355, a second rectifier 380, a switch 390, and a controller 395.

Further, in FIG. 7, detailed descriptions of overlapping portions with the content described in FIG. 1 to FIG. 6 will be omitted.

The receiving coil 360, the first frequency matching unit 345, the first rectifier 370, and the load 400 may be connected in cascade, and the receiving coil 360, the second frequency matching unit 355, the second rectifier 380, and the load 400 may be connected in cascade. Further, the switch 390 may be connected between one end of the first frequency matching unit 345 and one end of the second frequency matching unit 355.

The receiving coil 360 may wirelessly receive the power of a low frequency band or a high frequency band from the wireless power transmitter. For example, the low frequency band may be in a range of 100 kHz to 300 kHz, and the high frequency band may be one of 6.78 MHz and 13.56 MHz, but these are merely examples.

In an embodiment, when a frequency band used in power transmission of the wireless power transmitter 200 is a low frequency band, the wireless power transmitter 200 may be implemented as the tightly coupling method.

In an embodiment, when a frequency band used in power transmission of the wireless power transmitter 200 is a high frequency band, the wireless power transmitter 200 may be implemented as the loosely coupling method.

The receiving coil 360 may include one of a spiral type and a helical type.

The switch 390 may be turned off or turned on based on a control of the controller 395. In an embodiment, the turn-off of the switch 390 may refer to an open state, and the turn-on of the switch 390 may refer to a closed state.

In an embodiment, the switch 390 may be a metal oxide semiconductor field effect transistor (MOSFET) or a switch which uses an electromagnet, but it is not limited thereto.

The switch 390 may be connected between one end and the other end of the receiving coil 360, and may be closed or opened by the control of the controller 395 so that inductance of the receiving coil 360 may be changed.

The controller 395 may generally control operations of the wireless power receiver 300.

Particularly, the controller 395 may detect a frequency band of the power received from the wireless power transmitter. In an embodiment, the controller 395 may open or close the switch 390 to detect whether a frequency band of the power received from the wireless power transmitter is a low frequency band or a high frequency band.

The controller 395 may control operations of the switch 390 based on the detected frequency band to change the inductance of the receiving coil 360.

Next, a method of receiving power of a wireless power receiver according to an embodiment of the present invention will be described with reference to FIGS. 8 to 10. To this end, a method of receiving power of a wireless power receiver will be described combining the content of FIGS. 1 to 7 with the content of FIGS. 8 to 10.

FIG. 8 is a flowchart for describing a method of receiving power of a wireless power receiver according to an embodiment of the present invention.

Referring to FIG. 8, the wireless power receiver 300 may turn off the switch 390 to detect a frequency band used in power transmission of the wireless power transmitter 200 (S101). In an embodiment, the frequency band used in power transmission of the wireless power transmitter 200 may be a low frequency band or a high frequency band. For example, the low frequency band may be in a range of 100 kHz to 300 kHz, and the high frequency band may be one of 6.78 MHz and 13.56 MHz, but these are merely examples.

In an embodiment, when the frequency band used in power transmission of the wireless power transmitter 200 is a low frequency band, the wireless power transmitter 200 may be implemented as the tightly coupling method.

In an embodiment, when the frequency band used in power transmission of the wireless power transmitter 200 is a high frequency band, the wireless power transmitter 200 may be implemented as the loosely coupling method.

In an embodiment, the turn-off of the switch 390 may refer to an open state, and the turn-on of the switch 390 may refer to a closed state. The wireless power receiver 300 may turn off the switch 390 to detect whether a frequency band of a power received from the wireless power transmitter 200 is a low frequency band or a high frequency band.

Then, the wireless power receiver 300 wirelessly receives power from the wireless power transmitter 200 while the switch 390 is turned off (S103). That is, the wireless power receiver 300 may wirelessly receive power from the wireless power transmitter using the tightly coupling method or the loosely coupling method.

Then, the wireless power receiver 300 senses a current of the first rectifier 370 and a current of the second rectifier 380 generated by the received power to detect a frequency band which the wireless power transmitter 200 uses in power transmission (S105). In an embodiment, the wireless power receiver 300 senses the current of the first rectifier 370 and the current of the second rectifier 380 so that the wireless power receiver 300 may determine whether the frequency band which the wireless power transmitter 200 uses in power transmission is a high frequency band or a low frequency band.

In another embodiment, the controller 395 senses an output voltage of the first rectifier 370 and an output voltage of the second rectifier 380 instead of the current of the first rectifier 370 and the current of the second rectifier 380 so that the frequency band of a power transmitted by the wireless power transmitter 200 may be detected.

In an embodiment, when a current is sensed only in the first rectifier 370, the wireless power receiver 300 may determine the frequency band which the wireless power transmitter 200 uses in power transmission as a low frequency band. This will be described in detail with reference to FIG. 9.

FIG. 9 is a diagram for describing an operation of a wireless power receiver according to an embodiment of the present invention.

Referring to FIG. 9, the controller 395 may turn off the switch 390. A turned off state of the switch 390 may mean that the switch 390 is open as shown in FIG. 9. In this condition, the receiving coil 360 may receive power from the wireless power transmitter, and the controller 390 may sense a current flowing through the first rectifier 370 and the second rectifier 380.

When a current is sensed only in the first rectifier 370, the controller 395 may determine the frequency band of a power transmitted by the wireless power transmitter 200 as a low frequency band. That is, when the frequency band which the wireless power transmitter 200 uses in power transmission is the low frequency band, the power received by the receiving coil 360 may be transferred to the first rectifier 370 through the first frequency matching unit 345 matched with the frequency of the low frequency band, and a current may flow through the first rectifier 370. However, the second frequency matching unit 355 is matched with the frequency of a high frequency band, and therefore cannot pass the power of the low frequency band.

In another embodiment, currents flowing through both the first rectifier 370 and the second rectifier 380 may be sensed. In this case, when the current flowing through the first rectifier 370 is larger than the current flowing through the second rectifier 380 and the current flowing through the second rectifier 380 is small enough to be neglected when compared to the current flowing through the first rectifier 370, the controller 395 may determine that the frequency band of the power transmitted by the wireless power transmitter 200 is the low frequency band.

FIG. 8 will be described again.

Then, the wireless power receiver 300 determines whether only the current of the first rectifier 370 is sensed (S107), and when only the current of the first rectifier 370 is sensed, the wireless power receiver 300 determines that the frequency band which the wireless power transmitter 200 uses in power transmission is a low frequency band (S109). When the frequency band which the wireless power transmitter 200 uses in power transmission is determined as the low frequency band, the wireless power receiver 300 may maintain the switch 390 in a turned-off state and receive power. That is, the wireless power receiver 300, as shown in FIG. 9, may open the switch 390 to receive the power of the low frequency band. In this case, inductance of the receiving coil 360 is not changed because the switch 390 is in the opened state.

Meanwhile, when only the current of the first rectifier 370 is not detected, the wireless power receiver 300 turns on the switch 390 (S111).

When the switch 390 is turned on, the wireless power receiver 300 determines whether only the current of the second rectifier 380 is sensed (S113).

When only the current of the second rectifier 380 is sensed, the wireless power receiver 300 determines that the frequency band which the wireless power transmitter 200 uses in power transmission is a high frequency band (S115). Operations S111 to S113 will be described with reference to FIG. 10.

FIG. 10 is a diagram for describing an operation of a wireless power receiver according to another embodiment of the present invention.

Referring to FIG. 10, the controller 395 may turn on the switch 390. As shown in FIG. 10, the state in which switch 390 is turned on may mean that the switch 390 is closed. In this condition, the receiving coil 360 may receive power from the wireless power transmitter, and the controller 390 may sense a current flowing through the first rectifier 370 and the second rectifier 380.

When the current is sensed only in the second rectifier 380, the controller 395 may determine the frequency band of a power transmitted by the wireless power transmitter 200 as a high frequency band. That is, when the frequency band which the wireless power transmitter 200 uses in power transmission is the high frequency band, the power received by the receiving coil 360 may be transferred to the second rectifier 380 through the second frequency matching unit 355 matched with the frequency of the high frequency band, and a current may flow through the second rectifier 380. However, the first frequency matching unit 345 is matched with the frequency of the low frequency band, and therefore cannot pass the power of the high frequency band.

When the frequency band which the wireless power transmitter 200 uses in power transmission is determined as the low frequency band, the wireless power receiver 300 may maintain the switch 390 in the turned-on state and receive power. That is, the wireless power receiver 300, as shown in FIG. 10, may close the switch 390 to receive the power of the high frequency band. In this case, only a part of the receiving coil 360 rather than the whole receiving coil 360 may be used because the switch 390 is in the closed state. Accordingly, the inductance of the receiving coil 360 may be changed. For example, when the whole inductance of the receiving coil 360 is 16 uH and when the wireless power receiver 300 receives the power of the high frequency band, the inductance of the receiving coil 390 may decrease to 2 uH because the switch 390 is closed. Meanwhile, when the wireless power receiver 300 receives the power of the low frequency band, the receiving coil 390 may have an original inductance of 16 uH because the switch 390 is opened.

The wireless power receiver according to various embodiments of the present invention may receive power regardless of the frequency band which the wireless power transmitter 200 uses in power transmission, and therefore the convenience of a user who uses a terminal in which the wireless power receiver is embedded may be improved. That is, the user can easily charge the terminal regardless of the directly coupling method or the inductively coupling method used by the wireless power transmitter.

Further, according to embodiments of the present invention, because one receiving coil is used, a space of a terminal may be saved and cost may be greatly saved compared to the case in which two coils are used regardless of a power transmission method.

A method according to the present invention described above may be produced as a program which is executed in a computer, and may be stored in computer-readable media. Examples of the computer-readable media may include a read only memory (ROM), a random access memory (RAM), a compact disc ROM (CD-ROM), a magnetic tape, a floppy disk, an optical data storage device, etc. Further, examples of the computer-readable media may include media implemented in a carrier wave (e.g., transmission through internet).

The computer-readable media may be distributed in a computer system, and computer-readable codes may be stored in a distributed method and executed. Further, a functional program, codes, and code segments for implementing the method may be easily inferred by programmers skilled in the art to which the present invention pertains.

This written description sets forth the best mode of the invention. It should be understood by those skilled in the art that various modifications can be made without departing from the scope of the present invention and without changing essential features. Therefore, the above-described embodiments should be considered in a descriptive sense only and not for purposes of limitation. The scope of the present invention is defined not by the detailed description but by the appended claims, and encompasses all modifications or alterations derived from meanings, the scope and equivalents of the appended claims.

INDUSTRIAL APPLICABILITY

The wireless power receiver 400 according to the embodiments of the present invention may be installed in a mobile terminal such as a mobile phone, a smart phone, a laptop computer, a terminal for digital broadcasting, personal digital assistants (PDA), a portable multimedia player (PMP), a navigation system, etc.

However, it should be easily understood by those skilled in the art that structures according to the embodiments described in this specification may be applied to a fixed terminal such as a digital TV, a desktop computer, etc., except for the case only applicable to a mobile terminal.

DESCRIPTION OF THE SYMBOLS

100: POWER SUPPLY
200: WIRELESS POWER TRANSMITTER
210: TRANSMISSION INDUCTION COIL
220: TRANSMISSION RESONANCE COIL
300: WIRELESS POWER RECEIVER
310: RECEPTION RESONANCE COIL
320: RECEPTION INDUCTION COIL
330: RECTIFIER
400: LOAD

The invention claimed is:

1. A wireless power receiver which wirelessly receives power from a wireless power transmitter, the wireless power receiver comprising:
a receiving coil configured to wirelessly receive the power from the wireless power transmitter through a magnetic field;
a switch connected in parallel with the receiving coil; and
a first rectifier and a second rectifier configured to rectify power from the receiving coil, wherein the wireless power receiver controls an operation of the switch based on a frequency band of the power transmitted by the wireless power transmitter,
wherein the frequency band of the power transmitted by the wireless power transmitter includes a first frequency band and a second frequency band,
the first rectifier configured to rectify a power of the first frequency band received from the receiving coil and transfer the rectified power to a load, and
the second rectifier configured to rectify a power of the second frequency band received from the receiving coil and transfer the rectified power to the load.

2. The wireless power receiver of claim 1, wherein the first frequency band is lower than the second frequency band.

3. The wireless power receiver of claim 2, wherein the wireless power receiver opens the switch when the frequency band of the power transmitted by the wireless power transmitter is the first frequency band.

4. The wireless power receiver of claim 3, wherein the wireless power receiver opens the switch to maintain an inductance of the receiving coil.

5. The wireless power receiver of claim 2, wherein the wireless power receiver closes the switch when the frequency band of the power transmitted by the wireless power transmitter is the second frequency band.

6. The wireless power receiver of claim 5, wherein the wireless power receiver closes the switch to decrease an inductance of the receiving coil.

7. The wireless power receiver of claim 1, wherein the wireless power receiver senses a current flowing through the first rectifier and a current flowing through the second rectifier, and detects the frequency band of the power transmitted by the wireless power transmitter.

8. The wireless power receiver of claim 7, wherein when only the current flowing through the first rectifier is sensed, the wireless power receiver determines that the frequency band of the power transmitted by the wireless power transmitter is the first frequency band, and opens the switch.

9. The wireless power receiver of claim 7, wherein when only the current flowing through the second rectifier is sensed, the wireless power receiver determines that the frequency band of the power transmitted by the wireless power transmitter is the second frequency band, and closes the switch.

10. The wireless power receiver of claim 7, wherein when the current flowing through the first rectifier is larger than the current flowing through the second rectifier, the wireless power receiver determines that the frequency band of the power transmitted by the wireless power transmitter is the first frequency band, and opens the switch.

11. The wireless power receiver of claim 7, wherein when the current flowing through the second rectifier is larger than the current flowing through the first rectifier, the wireless power receiver determines that the frequency band of the power transmitted by the wireless power transmitter is the second frequency band, and closes the switch.

12. The wireless power receiver of claim 1, wherein the wireless power receiver senses an output voltage of the first rectifier and an output voltage of the second rectifier, and detects the frequency band of the power transmitted by the wireless power transmitter.

13. The wireless power receiver of claim 2, wherein the wireless power receiver opens the switch and detects the frequency band of the power transmitted by the wireless power transmitter.

14. The wireless power receiver of claim 13, wherein when the frequency band of the power transmitted by the wireless power transmitter is the first frequency band, the wireless power receiver maintains an open state of the switch.

15. The wireless power receiver of claim 2, wherein the wireless power receiver closes the switch and detects the frequency band of the power transmitted by the wireless power transmitter.

16. The wireless power receiver of claim 15, wherein when the frequency band of the power transmitted by the wireless power transmitter is the second frequency band, the wireless power receiver maintains a closed state of the switch.

17. The wireless power receiver of claim 1, further comprising:
a first frequency matching unit and a second frequency matching unit; and
the load configured to receive the rectified power from the first rectifier and the second rectifier, wherein the receiving coil, the first frequency matching unit, the first rectifier, and the load are connected in cascade, and the receiving coil, the second frequency matching unit, the second rectifier, and the load are connected in cascade, and the switch is connected between one end of the first frequency matching unit and one end of the second frequency matching unit.

18. The wireless power receiver of claim 17, wherein each of the first frequency matching unit and the second frequency matching unit includes a capacitor.

19. The wireless power receiver of claim 17, wherein the first frequency matching unit and the second frequency matching unit match a frequency band used by the wireless power receiver to a frequency band which the power received from the receiving coil has, and the first frequency matching unit outputs a matched power to the first rectifier and the second frequency matching unit outputs a matched power to the second rectifier.

* * * * *